Jan. 22, 1957     T. L. SMITH     2,778,662
AXIALLY AND RADIALLY SEALED DIVIDED SLEEVE TYPE PIPE CLAMP
Filed July 10, 1953     5 Sheets-Sheet 1
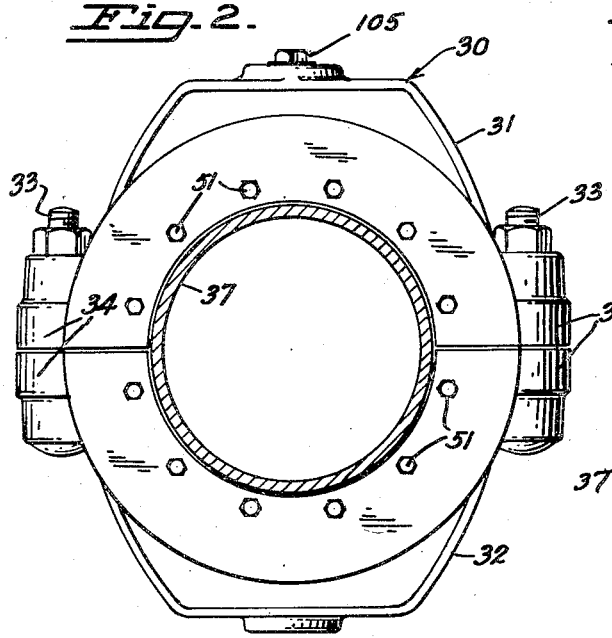
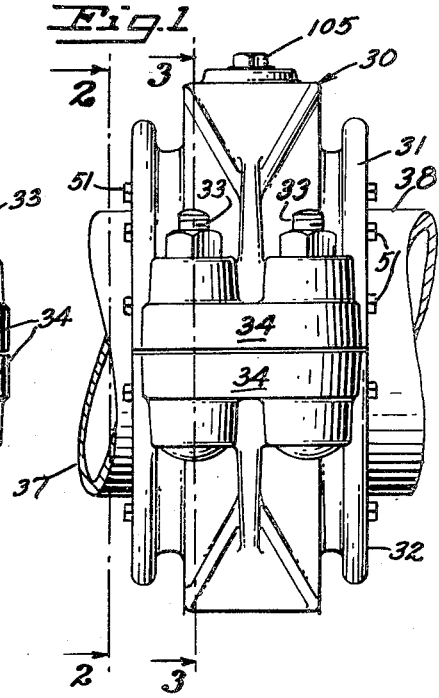
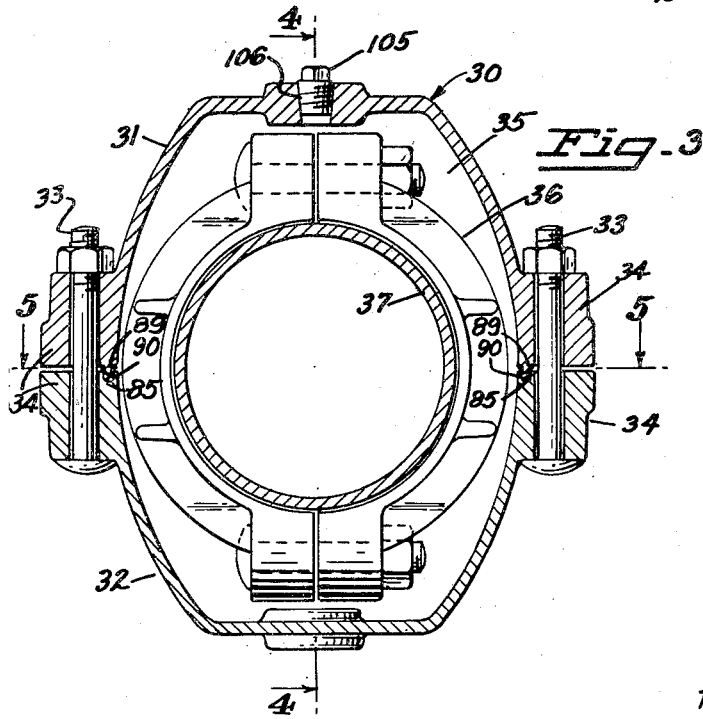
INVENTOR.
TELFORD L. SMITH
BY
ATTORNEY

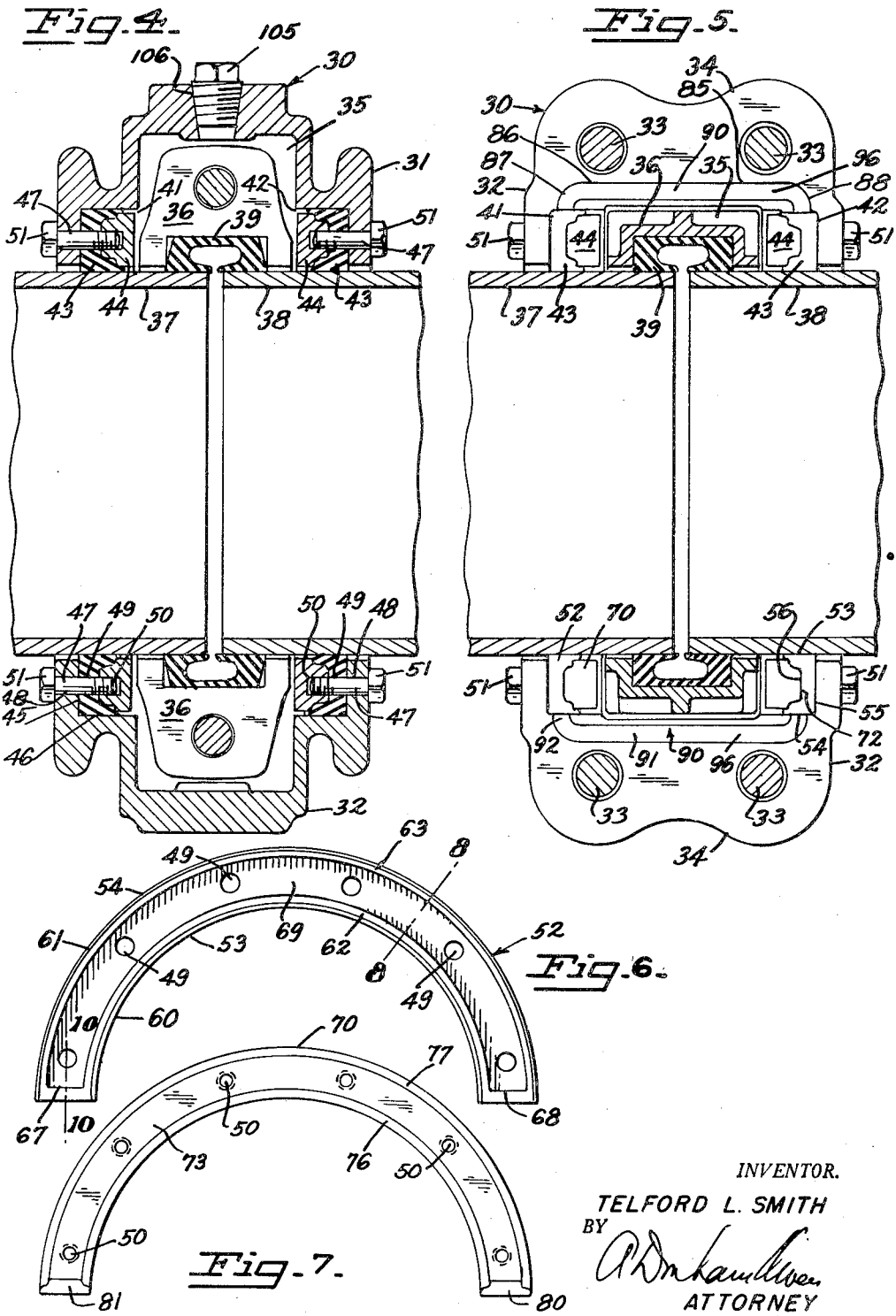

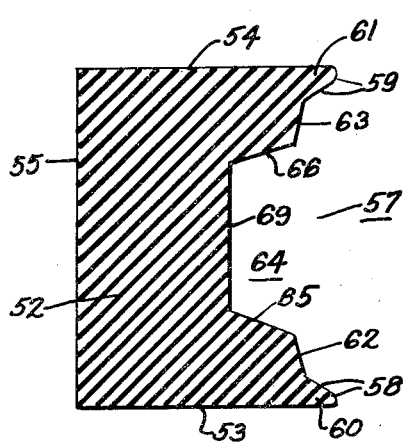
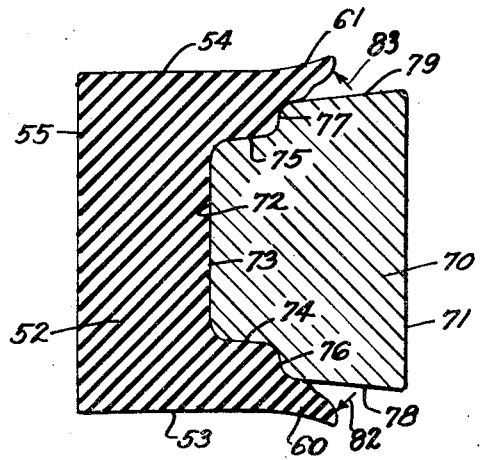
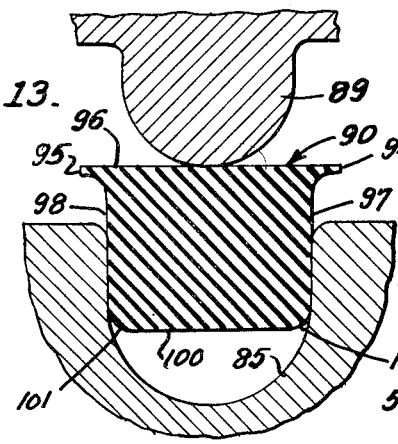
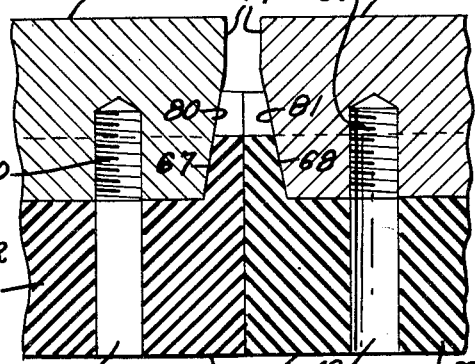
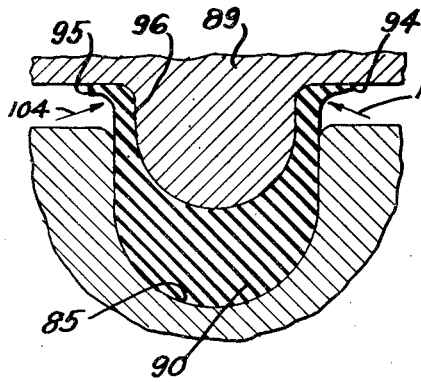
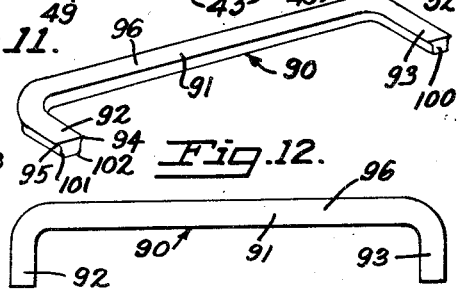
INVENTOR.
TELFORD L. SMITH
BY
ATTORNEY

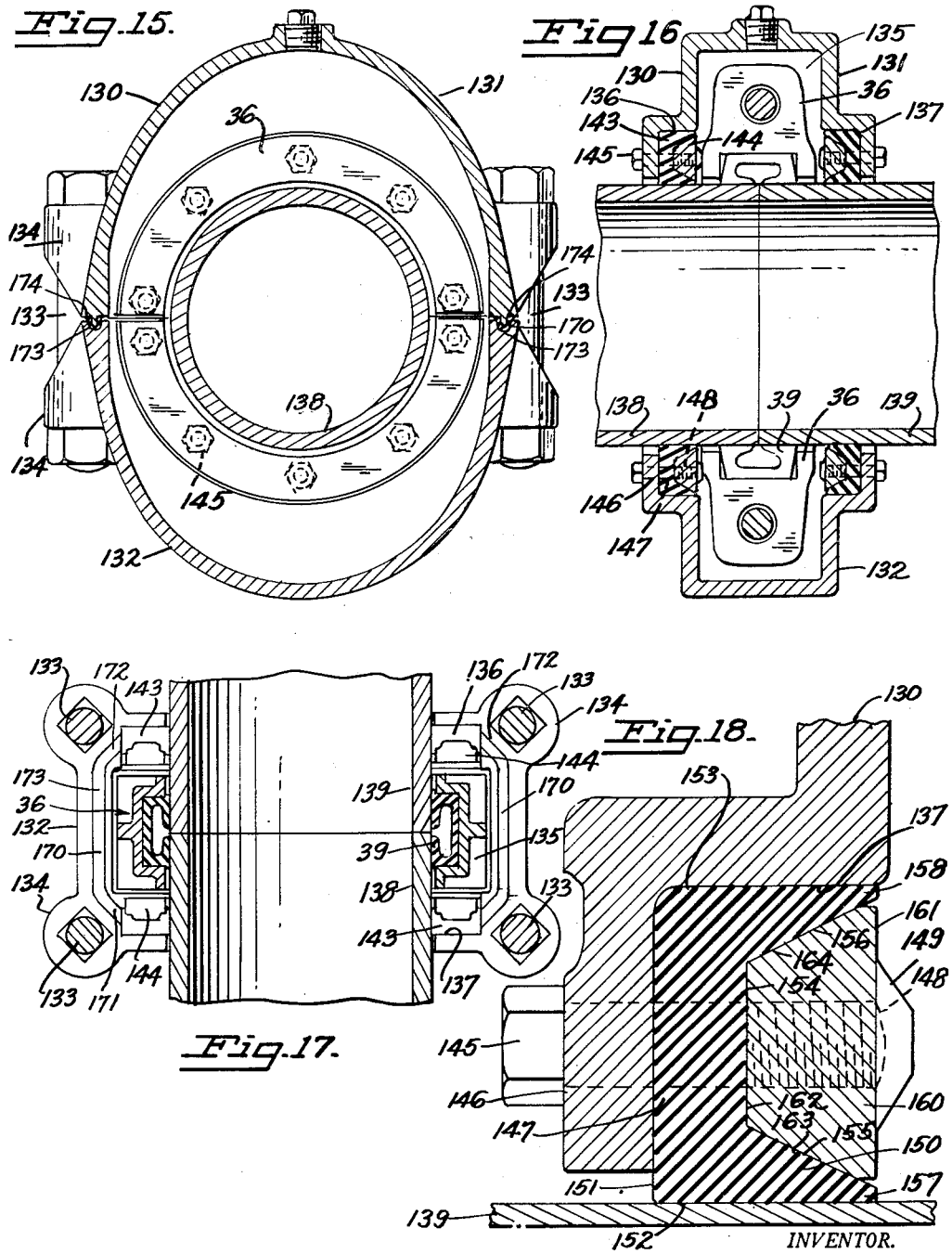

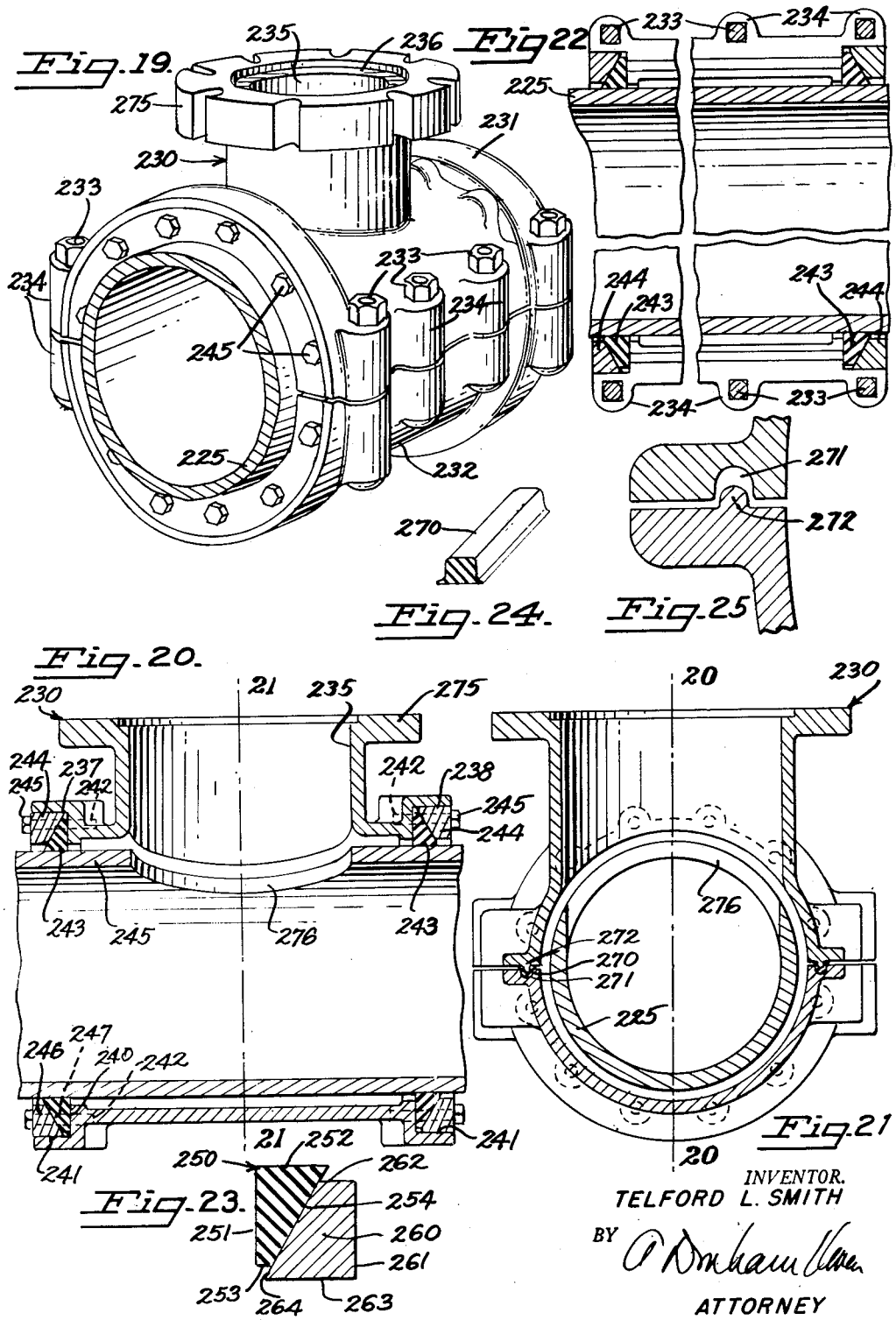

United States Patent Office 2,778,662
Patented Jan. 22, 1957

2,778,662
AXIALLY AND RADIALLY SEALED DIVIDED SLEEVE TYPE PIPE CLAMP

Telford L. Smith, South San Francisco, Calif.

Application July 10, 1953, Serial No. 367,239

5 Claims. (Cl. 285—343)

The present invention relates to improvements in two-piece sleeve clamps, for coupling or recoupling two coaxial pipes, end-to-end, as well as for attaching a pipe to the side wall of a main.

The sleeve clamp of this invention solves the long standing problem of preventing leaks at the junctures of pipes carrying fluid under very high pressures. It does this by providing sealing means which become tighter when the fluid pressure increases. In other words, the mechanical pressure holding the gaskets against the pipe wall is supplemented by the hydraulic pressure of the fluid, instead of being opposed or balanced or offset by it.

The following example illustrates the type of problem solved by this invention. The armed forces had a certain installation where gasoline was to be conveyed through eight-inch pipe at pressures between 1000 p. s. i. and 1800 p. s. i. Due to their size and type these pipes could not be threaded together or connected by a bell-and-spigot joint but had to be joined together by an external coupler. Absolutely no leakage of this highly explosive and highly inflammable fuel could be tolerated. The best conventional couplers available leaked at about 600 p. s. i., and other couplers specially designed for this purpose by competing manufacturers and their engineers also failed to solve the problem. Under high pressures the gasoline would either seep out or else blew out the gaskets. As a result, the installation could not be used until the coupler of the present invention was devised. This new coupler worked and prevented all leakage, because it was based on a new principle of operation, a surprising result obtained by combining its elements in a new way so that they functioned differently. This new principle utilizes the hydraulic pressure to help hold the gasket in, instead of blowing it out, and to make a tighter seal instead of causing leaks.

The invention employs a two-piece sleeve in combination with side gaskets and end gaskets. Each of the two end gaskets comprises a mating pair of semicircular resilient members of a novel configuration, which are compressed against the sleeve body by rigid metal pressure rings, so that they are forced radially outwardly against the sleeve wall and radially inwardly against the pipe wall, and in both instances the sealing action is increased by an increase in fluid pressure.

The side gaskets extend parallel to the pipe and lie between the two sleeve sections. Each side gasket is a rubber member of novel configuration that is compressed in a groove in one sleeve-half by an axial projection in the opposite sleeve-half, in such a way that the fluid pressure holds it in place and seals it tighter, rather than blowing it out or seeping past it. Thus, in both the side and end gaskets, the hydraulic pressure of the fluid is utilized by a novel structure to reinforce the mechanical pressure; whereas in the prior art the hydraulic pressure normally opposed the mechanical pressure, and when the hydraulic pressure was greater, the gasket leaked.

In addition to serving as a coupling or recoupling member for joining pipes in end-to-end relationship, the same basic principles are used in preventing leaks through cracked portions of otherwise sound pipe and in preventing leaks in connections made through the side wall of a main.

Other objects and advantages of the invention will appear in the following description of several preferred embodiments of the invention, given in compliance with 35 U. S. C. 112 as an illustration of the principles of the invention. However, it should be pointed out that the invention is not intended to be narrowly limited to the described structural details.

In the drawings:

Fig. 1 is a view in side elevation of a high-pressure, sleeve-clamp recoupler embodying the invention, shown installed around a pipe, the ends of the pipe being broken off to conserve space;

Fig. 2 is an end view of the same installation, with the pipe shown in section, taken along the line 2—2 in Fig. 1;

Fig. 3 is a view in section taken along the line 3—3 of Fig. 1, showing in elevation an interior coupling member which forms no part of the present invention but which is surrounded by the recoupler sleeve of the instant invention;

Fig. 4 is an enlarged view in section taken along the line 4—4 in Fig. 3;

Fig. 5 is a similar view taken along the line 5—5 of Fig. 3;

Fig. 6 is a plan view of one of the two identical semicircular halves of the end gasket, which are installed at each end of the recoupler of Fig. 1;

Fig. 7 is a plan view of one of the two identical semicircular compression ring-halves that compress the end gaskets;

Fig. 8 is a greatly enlarged view in section taken along the line 8—8 in Fig. 6 showing the end gasket in its uncompressed position;

Fig. 9 is a diagrammatic view similar to Fig. 8, showing how the compression ring of Fig. 7 forces out the sealing lips of the end gasket;

Fig. 10 is a view in section taken where the mating gasket halves meet, generally as shown in 10—10 in Fig. 6;

Fig. 11 is a view in perspective of the side gasket, enlarged somewhat from Fig. 5;

Fig. 12 is a plan view of the gasket of Fig. 11;

Fig. 13 is a greatly enlarged cross-sectional view of the gasket of Fig. 11, showing it partially installed in the sleeve, before pressure is applied;

Fig. 14 is a view similar to Fig. 13 showing the gasket and sleeve parts after pressure has been applied;

Fig. 15 is a view similar to Fig. 3 of a modified form of the invention;

Fig. 16 is a view similar to Fig. 4 of the device of Fig. 15;

Fig. 17 is a view similar to Fig. 5 of the device of Figs. 15 and 16;

Fig. 18 is a greatly enlarged view in section of one end gasket and related parts;

Fig. 19 is a view in perspective of a modified form of sleeve clamp, showing it encircling a main which is tapped so that a pipe can be threaded into its side;

Fig. 20 is a side view in section through the clamp of Fig. 19, taken along the line 20—20 in Fig. 21;

Fig. 21 is a view in section taken along the line 21—21 in Fig. 20;

Fig. 22 is a plan view, partly in section of the inner face of the lower sleeve half, showing where the side and end gaskets meet;

Fig. 23 is an enlarged view in section of the end gasket and compression ring;

Fig. 24 is a view in perspective and partly in section of the side gasket;

Fig. 25 is a view in section of the tongue and groove between which the side gasket is compressed.

The recoupler 30 (Figs. 1-14)—General description

The recoupler sleeve clamp 30 shown in Figs. 1 to 5 includes two generally semicylindrical mating sleeve halves 31 and 32, which are secured together by bolts 33 passing through lugs 34 at the sides of the sleeve halves 31, 32. While most features of the sleeve members 31 and 32 are identical, there are some differences which will be pointed out later.

As can be seen from Figs. 3–5, both sleeve halves 31 and 32 are generally U-shaped in longitudinal cross-section, a large central recess 35 being provided to accommodate a coupler member 36 of a type that is, in itself, old in the art and whose precise structure forms no part of this invention. The coupler 36 is bolted together around the ends of the two pipes 37 and 38 and is provided with a gasket 39. The problem has been that the fluid in the pipes 37, 38 has leaked when the fluid pressure reached about 600 p. s. i., because the fluid pressure then offset the mechanical pressure of the coupler 36 that sealed the gasket 39, and the fluid then leaked out between the gasket 39 and the pipes. The sleeve 30 solved this problem and eliminates this leakage. Because it surrounds the original coupler 36, the sleeve 30 is frequently called a "recoupler."

In addition to the central recess 35, the recoupler 30 is provided with end recesses 41 and 42 to accommodate the end gaskets 43 and pressure rings 44 (see Figs. 4 and 5). The purpose of each ring 44 is to provide the mechanical pressure necessary to tighten its gasket 43 against the radial face 45 and the axial face 46 of its recess 41 or 42 and against the axial wall of the pipe 37 or 38. The mechanical compression is accomplished by bolts 47 which pass through openings 48 in the sleeve halves 31 and 32, through perforations 49 in each gasket 43, and into threaded blind recesses 50 in the pressure plate rings 44. By turning the heads 51 of the bolts 47 from the outside, the bolts 47 are screwed further into the recesses 50, thereby forcing the pressure members 44 toward the adjacent radial faces 45 in the sleeve sections 31, 32. This compresses the gaskets 43 between the pressure mmebers 44 and the faces 45. At the same time it causes the gaskets 43 to expand radially against the pipes 37, 38 and the axial cylindrical sleeve faces 46, because of the novel structure of the gaskets 43, that will now be described.

The end gaskets 43 and the pressure rings 44

Each gasket 43 comprises two identical halves 52 (see Fig. 6). Each gasket-half 52 is a semicirclar rubber member, with three of its faces 53, 54, and 55 (see Fig. 8) normally substantially flat in cross-section, before compression. The inner peripheral face 53 is semicylindrical and is adapted to bear against the wall of the pipe 37 or 38; the outer peripheral face 54 is also semicylindrical and is adapted to bear against the axial face 46 of the clamp 30; and the radial face 55 is planar and is adapted to bear against the radial face 45 of the clamp 30. The face 56 which faces the pressure member 44 is stepped inwardly from both sides. A wide outer recess 57, provided between tapered shoulders 58 and 59, extends almost the whole width of the gasket half 52, so that the faces 53 and 54 end in narrow axial lips 60 and 61. Preferably the shelves 62, 63 at the bottom of the recess 57 slope in somewhat toward the center, and a second, inner, narrower recess 64 is provided inside the first recess 57. The recess 64 has tapered sides 65, 66, tapered ends 67, 68 (see Fig. 10) and a generally flat bottom surface 69.

Fig. 7 shows one of the two identical arcuate pressure plate sections or half-rings 70 that make up each pressure ring 44. Each plate's inner radial face 71, the one that faces the pipe juncture, may be flat, but its opposite radial surface 72 (the one that faces the gasket half-ring 52 and has the tapped recesses 50) is shaped to provide a flat central portion 73 with sides 74, 75 that flare outwardly to sloping shelves 76, 77, whose outer rims meet the steeply sloped axial faces 78, 79 of the half-ring 70. The width of the plate surface 72 is slightly greater than the width of the gasket bottom surface 69 between the walls 65 and 66. The ends 80, 81 of the half-rings 70 are also tapered and fit in the gasket's tapered end walls 67, 68 so that the two pressure-plate sections 70 do not actually abut each other when the clamp 30 is assembled.

Operation of the end gaskets 43

When the bolts 47 are tightened, the pressure half-rings 70 force the gasket halves 52 against each other at their ends. They also force the faces 54 of the gasket halves 52 radially outwardly against the axial face 46 of the sleeve 30, force the gasket's faces 55 axially outwardly against the sleeve radial face 45, and force the gasket's inner axial face 53 inwardly, snugly against the pipe 37 or 38. Due to the shape of the ring-halves 70, the lips 60 and 61 are forced out away from the center of the gasket and against the pipe walls and the faces 46, respectively. Since the lips 60, 61 are more responsive to the pressure ring 44 than the body of the gasket, they seal more tightly.

In addition to the mechanical pressure exerted on the gasket 43 by the ring 44 and sleeve 30 by means of the bolts 47, hydraulic pressure will act on the gasket 43, if the coupling 36 leaks, as is not uncommon under high pressure of more than about 600 p. s. i. This hydraulic pressure will act on the lips 60, 61, which have been spread out by the mechanical pressure. It cannot push the lips 60, 61 away from their walls because the vastly preponderant amount of the hydraulic pressure is in the directions indicated by the arrows 82, 83 in Fig. 9. Therefore, the hydraulic pressure will reinforce the mechanical pressure and will tend to increase the sealing force of the end gaskets 43.

The side gaskets 90

The lower sleeve 32 is provided at each side with a groove 85 (see Figs. 3, 5, and 13) which extends between the end gasket recesses 41 and 42 (see Fig. 5). The groove 85 has an axial portion 86 and two end radial portions 87 and 88 that lead directly into the gasket recesses 41, 42. The groove 85, as shown in cross-section in Fig. 13, has a curved wall.

The upper sleeve 31 is provided at each side with a raised projection or tongue 89, also curved in cross-section but considerably shorter and narrower. The projection or tongue 89 follows the same path as the groove 85 and fits in its portions 86, 87, 88, but is smaller in diameter and in cross-sectional area.

Two identical side gaskets 90 are pressed by the tongue 89 into the groove 85 and serves to prevent leakage from the sides of the coupling 30, just as the end gaskets 43 prevent leakage from the ends. The side gaskets 90 may be smaller in cross-section and may be also shorter in length than the end gaskets 43. Seen in plan (Fig. 12) its configuration corresponds generally to that of the groove 85—a very broad U with a long central portion 91 corresponding with the recess portion 86 and end portions 92, 93 that correspond to the recess portions 87, 88. As seen from the end or in cross-section, the gasket 90 is provided with a narrow flange 94, 95 at each side of its upper surface 96 (see Figs. 11 and 13), and the remainder of the gasket 90 is substantially rectangular, having side walls 97 and 98 and a bottom wall 100 joined to the sides by rounded lower edges 101, 102.

The gasket 90 is oversize with respect to the groove 85; it will not fit all the way in without pressure but will appear as in Fig. 13. When the coupling 30 is assembled around the pipes 37, 38 and the bolts 33 are tightened, the sleeve 31 tongue 89 bears against the gasket surface 96 and urges the gasket 90 down into the groove 85. Since the groove 85 has a curved lower surface, the gasket 90 is distorted into the position shown in Fig. 14 where it fills the space between the projection 89 and the recess 85. Obviously, this compression provides a very tight fit, so that the gasket 90 effectively prevents leaks along its entire length. But more than that, the flanges 94, 95 are folded up against the sleeve half 31 and its tongue 89, as shown in Fig. 14. Hydraulic pressure then will be directed along the direction indicated by the arrows 103, 104, thereby increasing the sealing effect. At the same time, the ends 92, 93 of the side gasket 90 are forced into a tight seal against the walls 54 of the end gaskets 43.

Assembly of the recoupler 30

The assembly of the clamp 30 begins by placing a gasket half 52 and its pressure plate half-ring 70 into each recess 41 and 42 of each of the two clamp halves 31 and 32. The bolts 47 are threaded into their openings 50 but are not fully tightened. The side gaskets 90 are positioned part way in the grooves 85, as in Fig. 13.

When the recoupler 30 is used to encircle a coupler 36, it will be assumed that that coupler 36 is already in place, or is installed in the normal way. It is not necessary in every instance to have this coupler 36 remain in place, but there is no reason for removing such a coupler, if it is already there. Before putting the two clamp halves 31, 32 together on opposite side of the pipes 37, 38, the threaded plug member 105 is removed from its socket 106. The purpose of this plug member is to allow air to escape from the recoupler 30 when the clamp 30 is tightened instead of building up the air pressure in the pipe, which could be a hazard, and is also to relieve hydraulic pressure as the clamp is installed. This makes it easier to put the clamp together and to get the proper tightness when the gaskets 43, 90 are clamped in.

When the two clamp halves 31, 32 (their gaskets 43, 90 being in place as said above) are put together, the lugs 34 are aligned, and the tongues 89 of the upper half 31 rest on top of their gasket 90 in alignment with the groove 85 in the lower half 32. Then the bolts 33 are passed through the lugs 34 and are tightened. This tightening causes the tongues 89 to force the gasket 90 into the groove 85 where it assumes the position shown in Fig. 14, so that there will be no leakage in between the sides of the clamp halves 31, 32 and so that any fluid pressure, which will act along the directions of the arrows 103, 104, will merely press the flanges 94, 95 outwardly and seal them still more tightly.

When the bolts 33 have been fully tightened, the gaskets 43 will usually be touching the pipe walls 37, 38 but will not be sufficiently tight. The necessary tightness is then obtained by tightening up on the bolts 47 with suitable wrenches engaging the heads 51. As the bolts are tightened, the gasket halves 52 are forced into engagement with each other at their ends and their wall 53 is flared out at the tapered edge 62 into firm contact with the pipe wall 37 or 38 so that an increase in fluid pressure will simply tighten the edge 62 still more against the pipe wall 37. At the same time the radial wall 55 of the gasket halves is firmly seated against the clamp walls 45, and the outer axial face 54 of the gasket halves is forced into tight contact with the clamp walls 46, especially at the tapered edges 61. Fluid pressure will simply cause a tighter sealing action, because in all cases the hydraulic pressure works in the same direction as the mechanical pressure. In this way pressures up to 1500 p. s. i. can be handled without leakage.

A coupler or repair clamp 130 (Figs. 15 to 18)

The clamp coupler 130 shown in Figs. 15 to 18 may be used in exactly the same way and for the same purpose as the coupler 30. Again it is shown surrounding the coupling member 36, which tends to leak under high pressure.

The clamp 130 comprises two halves 131 and 132 which may be somewhat ovoid or ellipsoidal in shape as shown in Fig. 15, in order to accommodate the coupler 36. Bolts 133 hold the two halves 131 and 132 together by passing through the lugs 134. On each end of the central recess 135 there are recesses 136 and 137 to accommodate the gasket and pressure ring. The pipes 138 and 139 and coupler 36 will therefore be encircled by the finished clamp 130.

The gasket 143 is a simplified version of the gasket 43 and the pressure clamp 144 is a simplified version of the pressure clamp 44. Bolts 145 extend in from the outside of the clamp 130 through openings 146, pass through openings 147 through the gasket and thread into the blind taps 148 in the pressure rings 144, the rings 144 being thickened at 149 so that the taps 148 may be relatively deep.

Each gasket half 150 is a semicircular rubber member with a planar radial face 151 adapted to bear against the clamp's radial wall, a cylindrical inner axial wall 152 that bears against the pipe 138, and a cylindrical outer axial wall 153 that bears against the clamp's radial wall. The other radial face of the gasket half 150 is recessed, having a planar radial portion 154 in between the two sloped portions 155 and 156. The sloping performs the same function as in the gasket 43 so that lips 157, 158 of the gasket 143 will be forced outwardly by the pressure rings 144, and this mechanical pressure will be reinforced by the hydraulic pressure of the fluid being sealed in.

The gasket rings 144 each comprise two sections 160 with its inner radial face 161 generally planar except for the thickened portions 149. Its shorter generally planar outer radial face 162, which is adapted to fit against the radial face 154 of the gasket, is somewhat wider than the face 154, so that the lips 157, 158 will be forced outwardly. Sloping side (axial) wall 163 and 164 correspond in slope approximately with the slope of the gasket portions 155 and 156 but being somewhat wider apart help force the gasket lips 157, 158 outwardly tightly against the pipe walls.

The side gasket members 170 are substantially identical in cross section to the gasket 90, but instead of having right angle portions at their ends corresponding to the portions 91 and 92, the gasket 170 has angularly extending end portions 171 and 172. Fundamentally the gasket 170 is the same as the gasket 90 and operates in exactly the same way, fitting in a groove 173 and being compressed mechanically by the tongue 174.

Assembly of the clamp 130 begins by inserting an end gasket half 150 and a clamp half 160 in each recess 136, 137 in each clamp half 131, 132 and the bolts 145 are threaded into place but are not fully tightened. The side gaskets 170 are placed in the grooves 173. Then the two clamp halves 131, 132 are put together around the pipe 138, and the bolts 133 are tightened to bring the gasket 170 into compression. When this has been accomplished the bolts 145 are tightened firmly to cause the gaskets 143 to seal tightly. Tightness is assured by the lips 157, 158.

A tapping clamp coupling (Figs. 19–25)

The modified coupler 230 shown in Figs. 19 to 25 is adapted to provide a connection between the main 225 and a branch pipe 236. It is made up of two half sleeves 231 and 232 that are secured together by bolts 233 that pass through the lugs 234 along the sides. In this instance there is no other coupler (such as would correspond to the coupler 36) inside the coupler 230, so that there is no recess corresponding to the recess 35 in the coupling 30, but there is a central opening 235 where the branch pipe 236 is connected.

Adjacent each end of the sleeve 230 are recesses 237 and 238, which extend in from the axially outer ends of the coupler 230 to their radial bounding wall 240 and their axial bounding wall 241. These walls 240, 241 are respectively planar-annular and cylindrical, and the radial wall 240 is provided with a plurality of threaded taps or blind recesses 242. An end gasket 243 fits in each recess 237, 238 and is held there by a clamping plate ring 244 and by bolts 245 which pass through openings 246 in the plate 244, openings 247 in the gasket 243, and then into the blind taps 242.

The gaskets 243 and plate 244 are each made in two pieces. The gasket 240 is composed of the two identical wedge-shaped semicircular halves 250. The inner radial face 25 of each gasket half 250 is planar and abuts the radial sleeve wall 240; both its inner and outer axial faces 252, 253 are cylindrical, the inner face 252 being considerably wider, and the outer radial face 254 is sloped between the two axial faces 252, 253.

The pressure ring 244 is also made up of two identical wedge-shaped halves 260, flared in the opposite direction. Its outer radial face 261 may be planar; its inner cylindrical axial face 262 is narrower than its outer cylindrical axial face 263; and its inner radial face 264 is sloped between the axial faces 262, 263, the slope being the same as that of the gasket face 254, but opposite. The outer axial face 263 may rest against or very near to the axial wall 241, while the inner axial face 252 of the gasket 240 is adapted to engage the main 225 and to prevent leakage from the ends of the sleeve 230.

The side gasket 270 is substantially identical in cross-sectional design with the side gasket 90 already described, as are the groove 271 and tongue 272 on the sleeves, and the operation is identical. The side gasket 270 differs from the gasket 90 principally in that there are no end portions corresponding to the portions 92 and 93; instead the gasket may be a perfectly straight member as shown in Figs. 22 and 24.

The central opening 235 leads out through an interiorly threaded turret 275 in which the branch pipe 236 may be threaded.

The assembly of this clamp 230 and its operation are similar to the assembly of the clamp 30 but the gaskets 243 and their compression members 244 may be put on either before the clamp 230 is set around the pipe 225 or afterwards. Thus, the assembly of the clamp may begin by first placing the side gaskets 270 in the grooves 271 and then fitting together the upper and lower clamp halves 231, 232 around the pipe 225 with their lugs 234 aligned. The bolts 233 may be inserted through the lugs 234 and partially tightened. Before the bolts 233 are fully tightened, however, the gaskets 243 and pressure rings 244 are placed in the end openings 237 and 238 and their bolts 245 are put in place and at least partially tightened. Then the bolts 233 are fully tightened, causing the side gaskets 270 to be locked firmly in place between the grooves 271 and tongues 272, the operation and action being the same as with the side gasket 90. Next the bolts 245 are fully tightened, so as to compress the inner periphery 252 of each gasket 243 against the wall of the main 225 and the radial face 251 against the clamp wall 241.

The clamp 230 is now in its sealing position around the pipe main 225. At this stage the hole through the wall of the main 225 may be drilled, a suitable valve being provided above the drill to prevent water from spurting out if there is water in the main. When the hole 276 is drilled and the water pressure in the main 225 temporarily shut off, the valve may be removed and the branch pipe 236 threaded into the opening 235, or, if it is not convenient to turn off the water pressure in the main 225, the valve is left in place, and the branch pipe 236 attached to it.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A sleeve-type pipe clamp capable of withstanding high fluid pressures without leaking, including in combination: a pair of mating, generally semicylindrical metal half-sleeves, each of said half-sleeves having a recess adjacent each end thereof defined by a shoulder having a radial wall, each of said radial walls having axially extending bolt openings therein, said half-sleeves also being provided with a pair of generally axially extending cooperating tongue and groove connections joining the recesses of each respective half-sleeve adjacent each end, the groove being totally disposed in one of said half-sleeves and the tongue being totally disposed in the other of said half-sleeves, the tongue and groove both being rounded in cross-sectional configuration with the radius of curvature of said groove being greater than the radius of curvature of said tongue, a pair of side gaskets, one in each of said grooves, each of said side gaskets being oversized in relation to the respective groove and being substantially rectangular in cross-sectional configuration in unstressed relaxed condition with a generally flat upper surface having transversely extending thin lips at each upper edge and substantially U-shaped in cross-sectional configuration when compressed in the respective groove by the respective tongue with the side gasket filling the space in the respective groove caused by the differential radii of the groove and tongue with the lips being forced outwardly around the curved surface of the respective tongue, bolts joining said half-sleeves together and tightening them toward each other causing said tongues and grooves to deform and press said side gaskets into said U-shaped configuration; a generally semicylindrical end gasket half-ring having inner and outer axially extending walls disposed within each recess with one radial wall of the gasket half-ring lying snugly against the radial wall of the recess in the respective half-sleeve and with the inner axially extending wall of the gasket half-ring being adapted to lie around a pipe, a generally semicylindrical rigid metal pressure half-ring for each gasket half-ring, each of said pressure half-rings having one radial face engaging the other radial wall of the respective gasket half-ring, said other radial wall of each end gasket half-ring and said one radial face of each pressure half-ring being of special cooperating configuration to force the outer axially extending wall of the respective gasket half-ring tightly against the shoulder of the respective half-sleeve and the inner axial extending wall of the respective gasket half-ring against a pipe, each of said gasket half-rings and said pressure half-rings having axially extending bolt receiving openings therein axially aligned with the bolt openings in said radial wall of the shoulder of the respective half-sleeve with the radial innermost openings being blind and threaded, and bolts extending axially inwardly through the aligned openings and threaded into said blind openings to tighten and urge said pressure half-rings toward the adjacent radial wall of the respective half-sleeve to tighten the respective gasket half-ring therebetween.

2. The clamp in accordance with the structure set forth in claim 1, wherein the said special cooperating configuration of the said other radial wall of each end gasket half-ring and said one radial face of each pressure half-ring is wedge shaped in cross-section and said pressure half-rings are disposed axially outwardly of the radial walls of the respective half-sleeves with said blind and threaded openings being in said radial walls of the half-sleeves.

3. The clamp in accordance with the structure set forth in claim 1, wherein the special cooperating configuration of the said other radial wall of each end gasket half-ring comprises an annular recess intermediate the radial edges defining axially extending lips on said radial edges and said one radial face of each pressure half-ring is radially oversized in relation to the recess in the respective gasket half-ring to force the respective axial lips radially outwardly against the shoulder of the respective half-sleeve and a pipe, and said pressure half-rings are disposed axially inwardly of the radial walls of the respective half-sleeve and contain the blind and threaded openings.

4. A sleeve-type pipe clamp capable of withstanding high fluid pressures without leaking, including in combination: a pair of mating, generally semicylindrical metal half-sleeves, each of said half-sleeves having a recess adjacent each end thereof defined by a shoulder having a radial wall, each of said radial walls having axially extending bolt openings therein, said half-sleeves also being provided with a pair of generally axially extending cooperating tongue and groove connections joining the recesses of each respective half-sleeve adjacent each end, the groove being totally disposed in one of said half-sleeves and the tongue being totally disposed in the other of said half-sleeves, the tongue and groove both being rounded in cross-sectional configuration with the radius of curvature of said groove being greater than the radius of curvature of said tongue, a pair of said gaskets, one in each of said grooves, each of said side gaskets being oversized in relation to the respective groove and being substantially rectangular in cross-sectional configuration in unstressed relaxed condition with a generally flat upper surface having transversely extending thin lips at each upper edge and substantially U-shaped in cross-sectional configuration when compressed in the respective groove by the respective tongue with the side gasket filling the space in the respective groove caused by the differential radii of the groove and tongue with the lips being forced outwardly around the curved surface of the respective tongue, bolts joining said half-sleeves together and tightening them toward each other causing said tongues and grooves to deform and press said side gaskets into said U-shaped configuration a generally semicylindrical end gasket half-ring having inner and outer axially extending walls disposed within each recess with one radial wall of the gasket half-ring lying snugly against the radial wall of the recess in the respective half-sleeve and with the inner axially extending wall of the gasket half-ring being adapted to lie around a pipe, a generally semicylindrical rigid metal pressure half-ring for each gasket half-ring, each of said pressure half-rings having one radial face engaging the other radial wall of the respective gasket half-ring, said other radial wall of each end gasket half-ring being recessed intermediate the radial edges to define axially extending lips on the radial edges and said one radial face of each pressure half-ring being radially oversized in relation to the recess in the respective gasket half-ring to force the respective axial lips outwardly and the outer axially extending wall of the respective gasket half-ring tightly against the shoulder of the respective half-sleeve and the inner axial extending wall of the respective gasket half-ring against a pipe, each of said gasket half-rings and said pressure half-rings having axially extending bolt receiving openings therein axially aligned with the bolt openings in said radial wall of the shoulder of the respective half-sleeve with the radial innermost openings being blind and threaded, and bolts extending axially inwardly through the aligned openings and threaded into said blind openings to tighten and urge said pressure half-rings toward the adjacent radial wall of the respective half-sleeve to tighten the respective gasket half-ring therebetween.

5. A sleeve-type pipe clamp capable of withstanding high fluid pressures without leaking, including in combination: a pair of mating, generally semicylindrical metal half-sleeves, each of said half-sleeves having a recess adjacent each end thereof defined by a shoulder having a radial wall, each of said radial walls having axially extending bolt openings therein, said half-sleeves also being provided with a pair of generally axially extending cooperating tongue and groove connections joining the recesses of each respective half-sleeve adjacent each end, the groove being totally disposed in one of said half-sleeves and the tongue being totally disposed in the other of said half-sleeves, the tongue and groove both being rounded in cross-sectional configuration with the radius of curvature of said groove being greater than the radius of curvature of said tongue, a pair of side gaskets, one in each of said grooves, each of said side gaskets being oversized in relation to the respective groove and being substantially rectangular in cross-sectional configuration in unstressed relaxed condition with a generally flat upper surface having transversely extending thin lips at each upper edge and substantially U-shaped in cross-sectional configuration when compressed in the respective groove by the respective tongue with the side gasket filling the space in the respective groove caused by the differential radii of the groove and tongue with the lips being forced outwardly around the curved surface of the respective tongue, bolts joining said half-sleeves together and tightening them toward each other causing said tongues and grooves to deform and press said side gaskets into said U-shaped configuration; a generally semicylindrical end gasket half-ring having inner and outer axially extending walls disposed within each recess with one radial wall of the gasket half-ring lying snugly against the radial wall of the recess in the respective half-sleeve and with the inner axially extending wall being adapted to lie around a pipe, a generally semicylindrical rigid metal pressure half-ring for each gasket half-ring, each of said pressure half-rings having one radial face engaging the other radial wall of the respective gasket half-ring, said other radial wall of each end gasket half-ring and said one radial face of each pressure half-ring being of wedge shaped configuration in cross-section to force the outer axially extending wall of the respective gasket half-ring tightly against the shoulder of the respective half-sleeve and the inner axial extending wall of the respective gasket half-ring against a pipe, each of said gasket half-rings and said pressure half-rings having axially extending bolt receiving openings therein axially aligned with the bolt openings in said radial wall of the shoulder of the respective half-sleeve with the radial innermost openings being blind and threaded, bolts extending axially inwardly through the aligned openings and threaded into said blind openings to tighten and urge said pressure half-rings toward the adjacent radial wall of the respective half-sleeve to tighten and wedge the respective gasket half-ring therebetween.

References Cited in the file of this patent

UNITED STATES PATENTS

| | | |
|---|---|---|
| 732,400 | Dresser et al. | June 30, 1903 |
| 811,631 | Graham | Feb. 6, 1906 |
| 1,940,729 | Pfefferle | Dec. 26, 1933 |
| 2,197,450 | Curtis | Apr. 16, 1940 |
| 2,239,307 | Weber | Apr. 22, 1941 |